United States Patent
Gregg, III

[11] 3,968,327
[45] July 6, 1976

[54] TELEVISION SIGNAL DISTRIBUTION SYSTEM

[75] Inventor: Ray V. Gregg, III, Redmond, Wash.

[73] Assignee: Sundstrand Data Control, Inc., Redmond, Wash.

[22] Filed: June 15, 1973

[21] Appl. No.: 370,402

[52] U.S. Cl............................ 178/6.8; 178/DIG. 13; 325/308
[51] Int. Cl.² ...................... H04N 7/10; H04H 1/08; H04N 7/18
[58] Field of Search.......... 178/DIG. 13, 6.8, DIG. 8, 178/5.1; 179/1 B; 325/308

[56] References Cited
UNITED STATES PATENTS

| | | | |
|---|---|---|---|
| 2,573,349 | 10/1951 | Miller et al. | 178/5.1 |
| 2,851,591 | 9/1958 | Braak | 325/308 |
| 3,157,737 | 11/1964 | Schlafly | 178/5.1 |
| 3,684,823 | 8/1972 | McVoy | 325/308 |
| 3,761,914 | 9/1973 | Hardy | 178/DIG. 13 |
| 3,796,829 | 3/1974 | Gray | 178/DIG. 13 |
| 3,911,204 | 10/1975 | Spinelli | 178/DIG. 13 |

Primary Examiner—Howard W. Britton
Assistant Examiner—Michael A. Masinick
Attorney, Agent, or Firm—Wegner, Stellman, McCord, Wiles & Wood

[57] ABSTRACT

A television signal distribution system for special programs in an establishment, as a motel, with plural receivers. A master antenna is connected through a cable distribution system with each of the receivers. Special program signals, as of a movie, are distributed through the cable on an unused channel. A filter at each receiver blocks the special signal from the receiver. A circuit actuated from a central control station is directed to the room over the telephone system and disables the filter enabling the occupant of the room to watch the special program.

5 Claims, 4 Drawing Figures

TELEVISION SIGNAL DISTRIBUTION SYSTEM

This invention is concerned with a television signal distribution system for a motel or the like where it is desired to make available special programs, as first-run movies, which the occupant of a room can watch for a fee. Systems which have been proposed in the past commonly require special signal distribution circuits, signal scramblers and unscramblers, or circuits controlled by coins, tokens, charge cards or the like to provide special program capability.

It is a principal object of this invention to enable a display of selected programs on selected receivers utilizing distribution circuitry which is already available and which does not require the viewer to have available coins or the like in order to make the circuit operative. The system does not interfere with the other uses of the circuitry which is employed, as distribution of other television signals.

One feature of the invention is the provision of a television signal distribution system to a plurality of receivers in which each receiver has one or more band suppression filters barring reception of corresponding channel signals. A control signal from a central control station is detected at the receiver and disables the filter at a selected receiver so that the program can be viewed. More particularly, circuits at the central control station generate a signal which is directed to the appropriate receiver over the telephone system. The operator at the central control station maintains a record of the programs watched for billing purposes.

Another feature is that the control signal transmitted from the central control station is momentary in character and that the signal detector at the receiver includes a holding circuit which maintains the filter in disabled condition.

A further feature is the provision of means for interrupting the hold circuit.

Yet another feature is that the signal detector circuitry requires a source of operating potential which is provided by a circuit connected in series with the power circuit of the television receiver. When the receiver is turned off, the detector circuit power circuitry is deenergized, breaking the holding circuit.

Still a further feature of the invention is that the band suppression filter includes a shunt connected series resonant circuit connected across the signal transmission circuitry through the low resistance contacts of an electromechanical relay which are opened to disable the filter.

Further features and advantages of the invention will readily be apparent from the following specification and from the drawings, in which.

The television signal distribution signal of this invention is particularly intended for establishments with plural receivers for use by individuals or independent small groups, where the receivers are served by a master antenna television signal distribution system. The receivers are commonly in separate rooms and the invention is particularly useful where there is a provision for selective communication from a central station to each room as through an internal telephone system. Establishments of this character include motels, hotels, hospitals and many apartment buildings. The system of the invention enables the management of the establishment to provide to the residents or guests special television programming on a controlled basis so that a fee may be charged, without the necessity for special signal distribution circuitry to the rooms, coin, token or card controls or the like. Some features of the invention may be used with other television signal distribution systems and are not limited to a system serving an establishment as described above.

Figure 1:
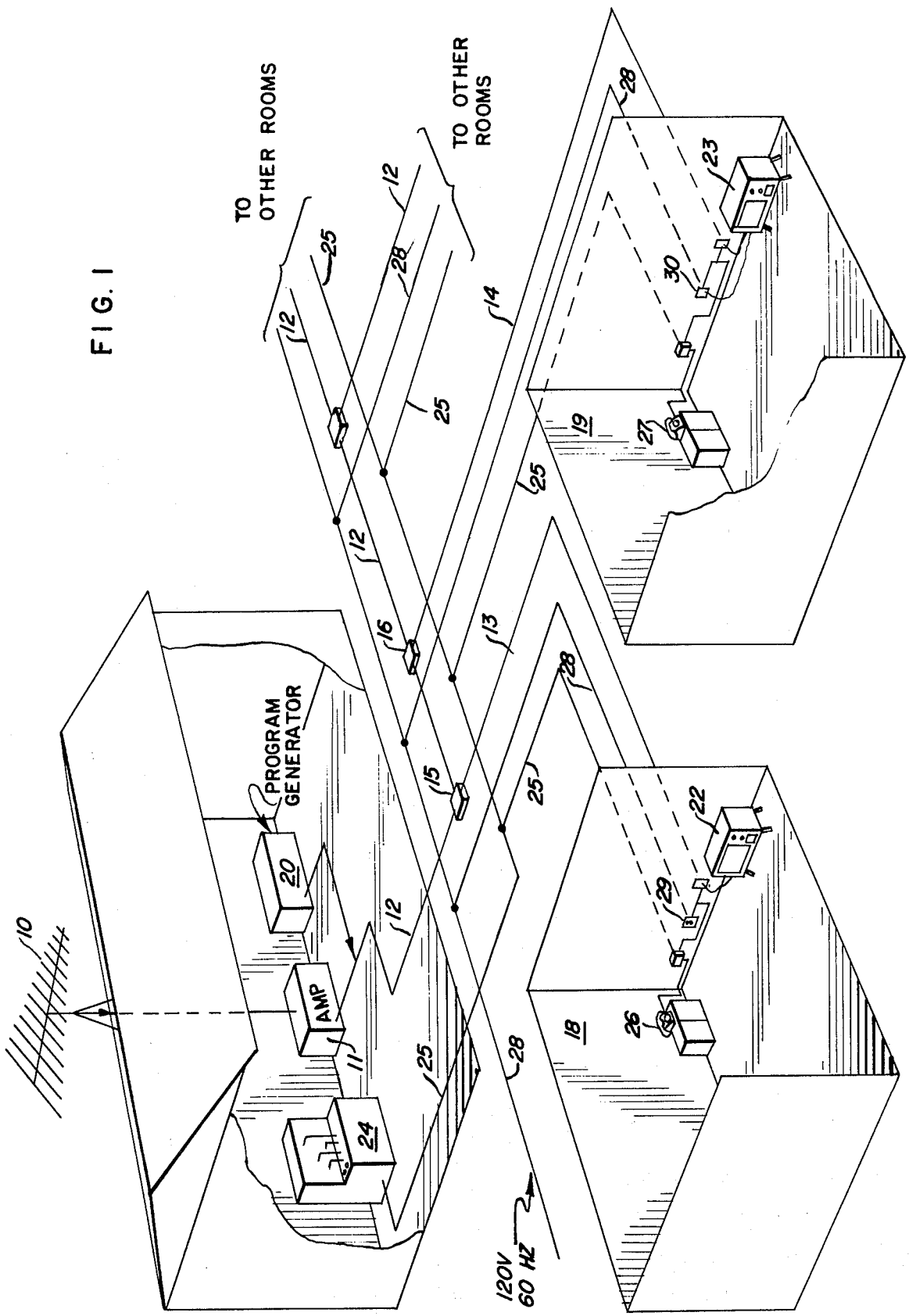
FIG. 1 is a diagrammatic illustration of an establishment with a television signal distribution system of the invention.

In a representative installation illustrated in FIG. 1, a television antenna 10 is connected with a multichannel amplifier 11, the output of which is connected to a suitable transmission line 12 which may, for example, be a coaxial cable having a low impedance, as 75 ohms. The cable 12 extends throughout an establishment, as a motel served by the system; and feeder sections, as 13 and 14, are connected through impedance matching couplers 15 and 16 from the cable 12 to individual rooms 18 and 19. A special program generator 20 is connected with the cable 12 and supplies one or more program signals on channels which are not received by antenna 10. Television receivers 22 and 23 in rooms 18 and 19 have antenna inputs connected through cables 13 and 14 with the signal distribution system 12.

The establishment, as is common, has an internal telephone system including switchboard 24 and a telephone cable network 25 connected with telephones 26 and 27 in each of the rooms. Electrical power, as 120 volt, 60 Hertz, is connected through power circuit 28 with female outlets 29 and 30 in the rooms.

Each of the rooms is provided with a channel enabling unit, to be described below, which incorporates a channel filter that suppresses the signals for one or more channels, and particularly for the channel signals from program generator 20. This filter is connected between the television signal distribution system 12 and the antenna input of the television receivers. A channel filter control signal generated at a central control station, as at telephone switchboard 24, is transmitted to a selected room, disabling the channel filter and allowing display of the program on the television receiver.

Figure 2:
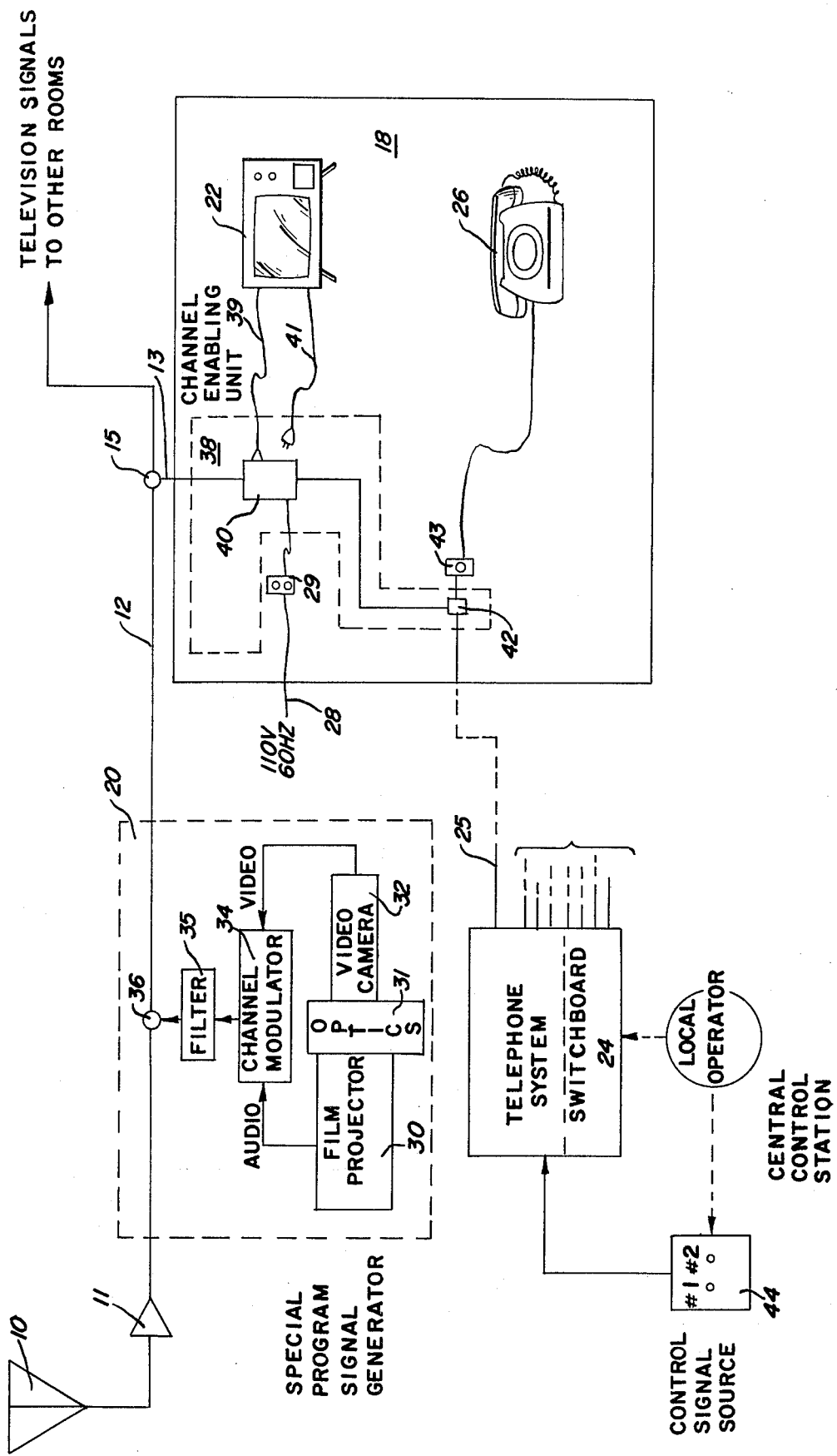
FIG. 2 is a block diagram of the signal distribution system.

In FIG. 2, portions of the system are illustrated in more detail. Antenna 10 receives television signals which are amplified at 11 and connected with the television signal distribution system 12. The special program signal generator 20 illustrated is suitable for broadcasting first-run movies, for example, over the television signal distribution system. A film projector 30 directs the picture image through optics 31 to a video camera 32 which develops a suitable video signal that is in turn connected with channel modulator 34. The sound track of the movie is coupled from film projector 30 to an audio input of the channel modulator. The composite television signal from the modulator is connected through a filter 35 and coupler 36 with distribution cable 12.

A channel enabling unit 38 is illustrated in a typical room 18. Television receiver 22 has an antenna lead in 39 connected through a filter and control circuit 40, feeder 13 and coupler 15 with signal distribution cable 12. The power cord 41 for the receiver is coupled through filter and control circuit 40 and a wall outlet 29 with the power distribution circuit 28. A control signal input to the channel filter and control circuit 40 is provided by a pickup unit 42 connected with the telephone cable 25 at a point between the telephone wall box 43 and telephone signal distribution system 25. The local operator at the central control station utilizes switchboard 24 and control signal source 44 to direct a control signal to a selected room disabling a selected channel filter at the room to enable the occupant to receive a special program.

In a typical situation, the establishment management might schedule a selection of one or more special programs for particular time periods. For example, a first-run movie might be made available to the guests in a motel as an alternate to local television programs during the evening hours. A motel guest who wishes to watch the movie calls the telephone operator over the telephone system 25 before the movie is scheduled to start. The operator by actuation of the control signal source 44 directs an appropriate channel filter control signal to the selected room disabling the channel filter so that the guest can watch the movie. The telephone operator makes a record of the special service provided to the guest and the charge therefor is added to the room bill.

The channel filter control signals are continuous fixed frequency signals preferably in the range of 4 to 8 KHz. The transmitter of the telephone 26 has a sharp cutoff above 3 KHz and use of a control signal at a higher frequency prevents a guest from transmitting a signal which would simulate the control signal. An audible masking tone may be transmitted with the control signal so the guest will not terminate the phone connection during the few seconds required to disable the channel relay and establish a holding circuit.

Figure 3:
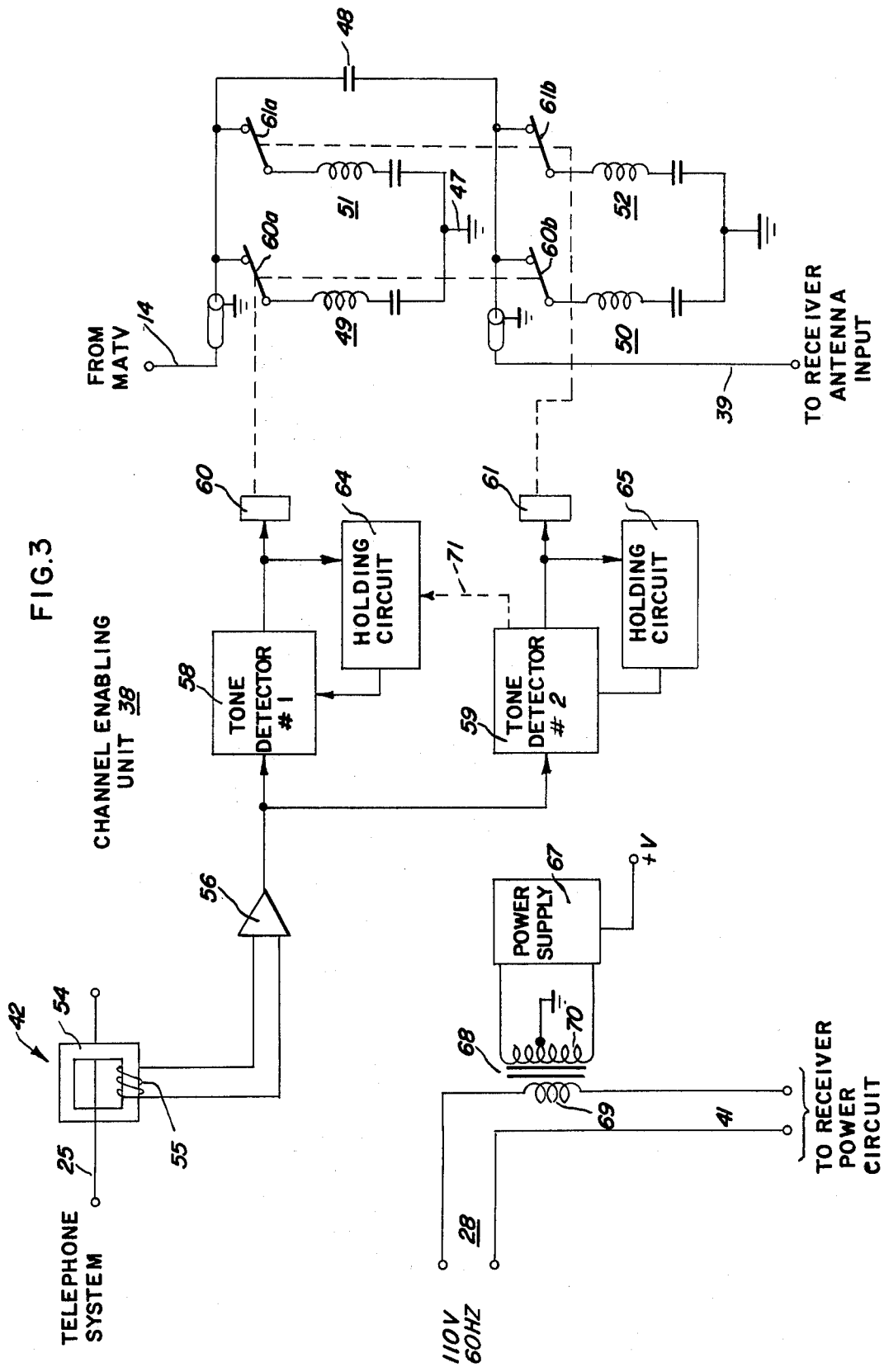
FIG. 3 is a block diagram of the detector and filter circuitry at the receiver.

The channel enabling unit 38 is illustrated in more detail in FIG. 3. Band suppression filters which block the signals for two television channels are shown. Each is a pi filter with series connected inductor-capacitor circuits connected in shunt from the signal channel to ground 47. A series connected capacitor 48 is common to the filters for each channel. The filter for one channel includes shunt circuits 49 and 50 while that for the second channel includes shunt circuits 51, 52. The shunt circuits are series resonant at the carrier frequency of the television signal channel which is suppressed. Each shunt filter section has a high L/C ratio and a high Q. There is a negligible degree of adjacent channel degradation.

The filter for a channel is disabled allowing the channel signal to reach the television receiver by disconnecting the shunt filter elements from the signal circuit. Preferably each shunt element is connected with the signal circuit through the low resistance contact of an electromechanical relay. Practical semiconductor switches are not feasible as they have excessive resistances which would lower the circuit Q, reducing the attenuation of the suppressed channel signal and broadening the suppression band to interfere with adjacent channel signals.

The channel filter control signals from telephone system 25 are connected through pickup 42, here a current transformer having a core 54 surrounding telephone cable 25 and a secondary winding 55, to an amplifier 56. Frequency selective tone detectors 58, 59 respond to the control signals No. 1 or No. 2 to actuate the relays 60, 61, respectively. Relay 60 opens filter switches 60a, 60b to enable the reception of one channel while relay 61 opens relay contacts 61a, 61b to enable reception of a second channel. Connected with tone detector 58 and relay 60 is a holding circuit 64 which responds to the control signal, as will appear, to latch the tone detector circuit maintaining relay 60 energized. Similarly, holding circuit 65 responds to the output of tone detector 59 to latch it in the actuated position maintaining relay 61 energized.

In accordance with a preferred form of the invention, an operating voltage for the tone detectors, holding circuits and relays is provided by a power supply 67 which is energized through a transformer 68 with a primary winding 69 connected in series with the circuit from the power distribution system 28 to the power circuit 41 of the television receiver. So long as the television receiver is turned on, current flows through primary winding 69 inducing a voltage in the secondary winding 70 to energize power supply 67. When the television receiver is turned off, there is no current flow and power supply 67 has no output. Holding circuits 64 and 65 are so connected with tone detectors 58 and 59 that deenergization of power supply 67 interrupts the holding action and relays 60, 61 are deenergized. Thus, a channel filter which is disabled or removed from the circuit in response to a control signal from the central control station is returned to the circuit when the television circuit is turned off. Further details of this circuitry will be discussed below.

In an alternate form of the channel enabling unit the local operator may be given direct control both to disconnect and to reconnect a channel filter. More specifically, the output of tone detector No. 2, instead of operating channel relay 61, may be connected to break holding circuit 64 as indicated by broken line 71.

The television signal distribution system is illustrated in FIG. 3 with band suppression filters to prevent the reception of signals in certain channels by a television receiver. The same result can be achieved, although with more expensive circuits, by scrambling the signal for selected channels at the special program signal generator and providing at each receiver a signal unscrambler which is actuated in response to the reception of a control signal. It should be understood that general references in the specification and claims to a filter or a band suppression filter for a selected signal channel are intended to include other means, as a scrambler-unscrambler combination for preventing reception or intelligible display of selected channel signals.

Figure 4:
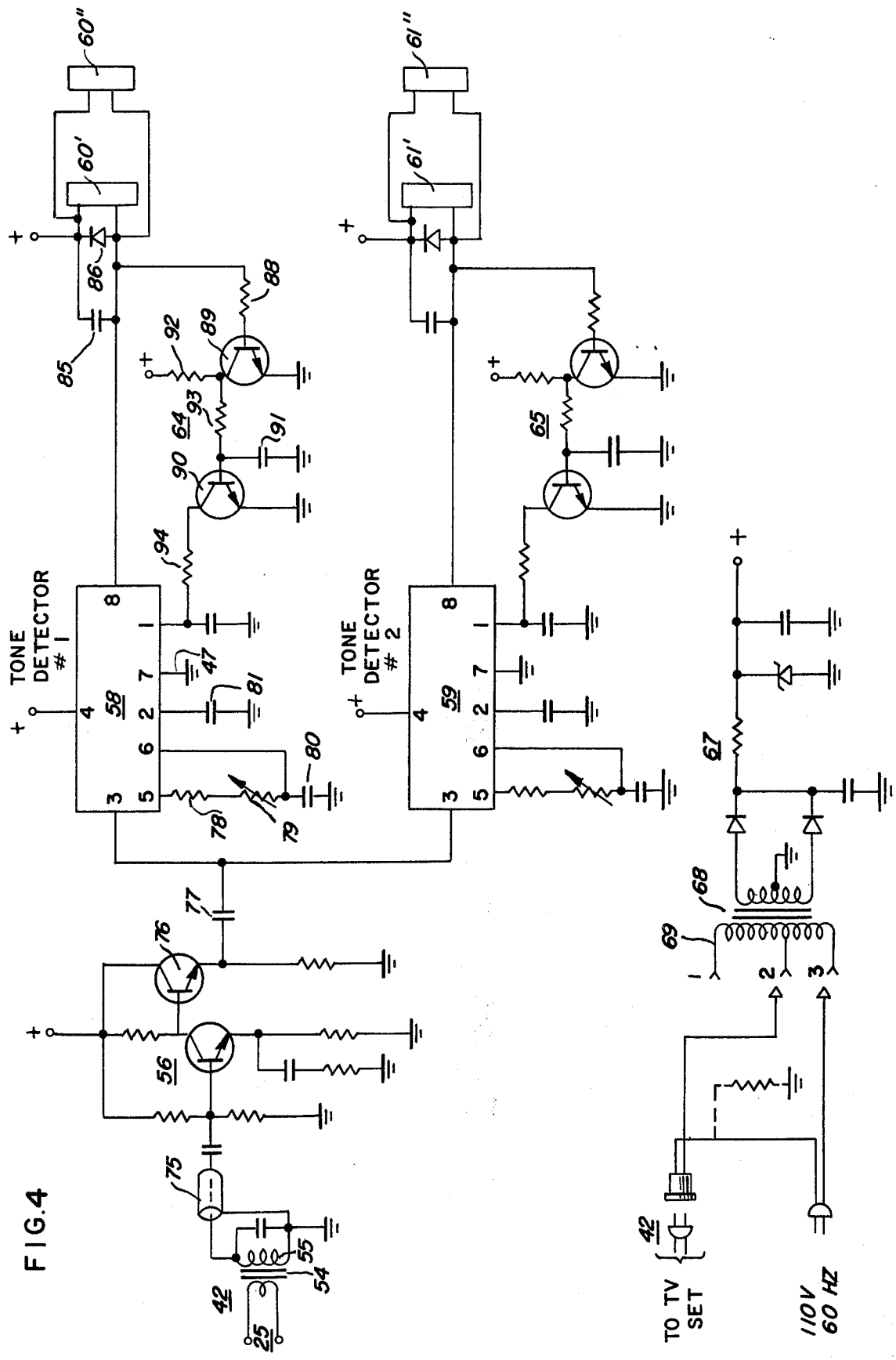
FIG. 4 is a schematic diagram of the circuits of FIG. 3.

The control signal detectors and power supply of the channel enabling unit are shown in schematic form in FIG. 4.

The tone signal from the telephone system 25 is coupled through transformer 54 of pickup 42 and shielded cable 75 to transistor amplifier 56. The amplifier output from emitter-follower 76 is coupled through capacitor 77 to tone No. 1 and No. 2 detectors 58 and 59. The tone detector circuits are the same except for the frequency determining component values and only the circuit of tone No. 1 detector 58 will be described in detail.

The tone detector which is illustrated is a phase locked loop utilizing an integratd circuit LM567 of National Semiconductor Corp., Santa Clara, California. The control signal input is connected to terminal 3. The frequency of the tone which is detected is determined by the time constant of the resistor-capacitor circuit, resistors 78, 79 and capacitor 80, coupled with terminals 5 and 6 of the integrated circuit. The band width of the detector is established by the value of capacitor 81 connected with terminal 2 of the circuit. A positive operating voltage of the order of seven volts is connected with terminal 4 while terminal 7 is returned to a reference potential or ground 47. When a signal of the appropriate frequency is applied to input terminal 3, output terminal 8 goes from a high impedance level to ground, energizing parallel connected relay coils 60', 60'' from the seven volt source.

Two independent relays are preferably utilized to actuate contacts 60a, 60b to prevent spurious coupling of the television signals between the two relay coils and their contacts. Capacitor 85 and diode 86 connected across the relay coil terminals dissipate the energy in the relays when they are deenergized, preventing damage to other circuit components.

Holding circuit 64 latches relays 60', 60'' in the energized condition so that the circuit responds to a momentary control signal from the central control station to disable the channel filter until the holding circuit is released or broken. Prior to the reception of a tone signal, detector terminal 8 is at a high impedance level. The lower terminals of relays 60', 60'' are positive with respect to ground by virtue of the positive potential from the power supply applied to their upper terminals thereof. This positive potential is applied through resistor 88 to the base of transistor 89, causing it to conduct and grounding the base of transistor 90 so that it is nonconductive. When tone No. 1 is detected terminal 8 of the detector goes to ground energizing the relays. The base of transistor 89 drops to ground level, turning off the transistor whereupon capacitor 91 begins to charge through resistors 92 and 93. As the capacitor charges, the positive potential at the base of transistor 90 increases until transistor 90 conducts, grounding terminal 1 of tone detector 58 through resistor 94. This action latches the tone detector output and relays 60', 60'' in the actuated condition even though the tone input signal is discontinued. The relative circuit values of the components of holding circuit 64 determine the time duration of the tone signal which is required to latch the holding circuit. The principal components in determining this time are capacitor 91 and resistors 92 and 93. In a representative circuit a tone signal duration of 2½ to 3 seconds has been found adequate. This is sufficient to prevent latching of a channel enabling circuit as a result of transient signals in the telephone system and does not unduly require the attention of the operator at the central control station.

As discussed in connection with FIG. 3, when power to the receiver is turned off, the positive energizing potential for the tone detector circuitry is removed interrupting the holding circuit. Relays 60', 60'' are deenergized returning the channel filters to the television signal distribution circuit. More particularly, the base of transistor 89 is removed from ground and capacitor 91 discharges through resistor 93 and the collector-emitter circuit of transistor 89. The time constant of the capacitor discharge circuit is such that approximately three seconds are required for the voltage at the base of transistor 90 to fall below the turn on level. This time delay in interrupting the holding circuit prevents deenergizing the channel filter relays in the event of a transient interruption of the 110 volt power system.

Power supply transformer 68 has a tapped primary winding 69 which may appropriately be connected in the circuit depending on the current drawn by the television receiver with which the channel enabling unit is utilized. For example, if the television receiver draws a small current, connection should be made to terminals 1 and 3 of the primary winding while if the television set has a large current rating the connection may be made to terminals 2 and 3.

I claim:

1. A television signal distribution system for a plurality of multiple channel receivers, comprising:
   a source of television signals for each of a plurality of channels;
   circuit means for conducting said television signals from said source to each of said receivers;
   further circuit means connected from said control station to each of said receivers, independent of said television signal conducting circuit means;
   band suppression channel filters for at least one of said channels, connected between said circuit means and each of said receivers;
   a central control station;
   means actuated by an operator at said central control station and operative without manipulation of any circuit control by the viewer at the receiver to transmit a momentary channel filter control signal to a selected receiver from said control station over said further circuit means;
   signal detecting means requiring a source of operating potential at each of said receivers, responsive to said channel filter control signal for disabling the channel filter at a selected receiver, including a hold circuit maintaining the channel filter in disabled condition following termination of said control signal; and
   means providing said operating potential, said receiver having a selectively operable power circuit for connection with an alternating power source, and said means providing the operating potential for said channel filter control signal detecting means being actuated upon operation of said receiver and including a transformer with a primary winding connected in series with the power circuit of said receiver.

2. A television signal distribution system for a plurality of multiple channel receivers, comprising:
   a source of television signals for each of a plurality of channels;
   circuit means for conducting said television signals from said source to each of said receivers;
   further circuit means connected from said control station to each of said receivers, independent of said television signal conducting circuit means;
   band suppression channel filters for at least one of said channels, connected between said circuit means and each of said receivers;
   a central control station;
   means actuated by an operator at said central control station and operative without manipulation of any circuit control by the viewer at the receiver to transmit a momentary channel filter control signal to a selected receiver from said control station over said further circuit means;
   signal detecting means requiring a source of operating potential at each of said receivers, responsive to said channel filter control signal for disabling the channel filter at a selected receiver, including a hold circuit maintaining the channel filter in disabled condition following termination of said control signal;

means providing said operating potenial, said receiver having a selectively operable power circuit for connection with an alternating power source, and said means providing the operating potential for said channel filter control signal detecting means being actuated upon operation of said receiver and including a transformer with a primary winding connected in series with the power circuit of said receiver; and means to interrupt said hold circuit, including means providing a time delay in such interruption.

3. A television signal distribution system for a plurality of multiple channel receivers, comprising:
   a source of television signals for each of a plurality of channels;
   circuit means including a low impedance transmission line connected from said source of television signals to each of said receivers for conducting said television signals from said source to each of said receivers;
   a band suppression channel filter for at least one of said channels connected between said circuit means and each of said receivers, said filter having a series connected inductor and capacitor connected in shunt across said transmission line and resonant at the frequency of the video carrier of the television signal;
   a central control station; and
   means actuated by an operator at said central control station and operative without manipulation of any circuit control by the viewer at the receiver to disable the channel filter at a selected receiver.

4. The television signal distribution system of claim 3 including an electromechanical relay having low resistance contacts connecting said inductor and capacitor with said transmission line.

5. The television signal distribution system of claim 4 in which said band suppression filter is a pi network with two series resonant inductor-capacitor circuits connected in shunt acros said transmission line and with a third capacitor connected in series with the transmission line between said two shunt circuits, and two separate electromechanical relays having low resistance contacts connecting the shunt circuits with the transmission line.

* * * * *